106-75. AU 116 EX
6-26-73 XR 3,741,898

June 26, 1973 W. A. MALLOW ET AL 3,741,898

FOAMED PRODUCT FROM SODIUM SILICATE AND PROCESS OF MANUFACTURE THEREOF

Filed July 9, 1971 2 Sheets-Sheet 1

William A. Mallow
Richard A. Owen
Ethelbert J. Baker, Jr.
INVENTORS

BY James H. Weiler, Jefferson D. Giller & Dudley R. Dobie, Jr.
ATTORNEYS

William A. Mallow
Richard A. Owen
Ethelbert J. Baker, Jr.
INVENTORS

BY James H. Weiler,
Jefferson D. Giller &
Dudley R. Dobie, Jr.
ATTORNEYS

United States Patent Office 3,741,898

Patented June 26, 1973

3,741,898

FOAMED PRODUCT FROM SODIUM SILICATE AND PROCESS OF MANUFACTURE THEREOF

William A. Mallow, Richard A. Owen, and Ethelbert J. Baker, Jr., San Antonio, Tex., assignors to Southwest Research Institute, San Antonio, Tex.

Continuation-in-part of applications Ser. No. 868,113, Oct. 21, 1969, and Ser. No. 102,504, Dec. 29, 1970. This application July 9, 1971, Ser. No. 161,218

Int. Cl. E04b *1/74*

U.S. Cl. 252—62 19 Claims

ABSTRACT OF THE DISCLOSURE

A solidified foamed material is made by frothing a mixture of an aqueous solution of sodium silicate, a surface tension depressant and a silicon dioxide polymer forming agent with or without the inclusion of an alkali metal silicate gelling agent. In one form, the product is free of any substantial amount of filler. In another form, a filler is required.

CROSS-REFERENCES TO RELATED APPLICATIONS

This is a continuation-in-part of U.S. patent application No. 868,113 filed Oct. 21, 1969, now abandoned, by William A. Mallow, Richard A. Owen and Ethelbert J. Baker, Jr. for Foamed Product From Alkali Metal Silicates and Process of Manufacture Thereof; and of U.S. patent application No. 102,504 filed Dec. 29, 1970, now abandoned by William A. Mallow, Richard A. Owen and Ethelbert J. Baker, Jr. for Solidified Silica Foam Product and Process.

BACKGROUND OF THE INVENTION

The field of art to which the invention pertains is the manufacture of a solidified silica foam product from sodium silicate. An important use of the product is as a structural and insulation material. Its resistance to high temperature and moisture, together with its low thermal conductivity and excellent mechanical strength, makes it especially suited to such use.

Applicants know of no commercial foamed alkali metal silicate product developed by others that does not contain a filler of some type, such as fibers, to give it strength. With one form of the process and product of the present invention, no fillers are included and yet there results a foamed product which at lower densities has greater compressive strength than if the fillers were included.

The formula for sodium silicate in an aqueous solution is $Na_2O\cdot(SiO_2)_n\cdot xH_2O$ wherein $n$ is any number between 1 and 5 and $x$ is 1 or larger.

The most pertinent prior art of which applicants have knowledge is U.S. Pat. No. 1,944,008 issued Jan. 16, 1934 to Floyd B. Hobart for Heat Insulating Material and Method of Making Same and U.S. Pat. No. 3,136,645 issued June 9, 1964 to Howard M. Dess for Production of Mineral Foam. Attention is also directed to U.S. Pat. No. 3,466,221 issued Sept. 9, 1969 to Robert H. Sams et al., for Expanded Silicate Insulation.

Hobart in his patent teaches the manufacture of a foamed product made from an aqueous solution of sodium silicate which product contains a large amount of filler such as fibers of asbestos or rock, slag or glass wools or other fillers such as clay or fly ash. Hobart mixes aqueous sodium silicate with a surface tension depressant to alter the surface tension of the sodium silicate to permit foam to be formed by agitation of the sodium silicate. Examples of his surface tension depressants are saponin, sodium oleate, or other soaps, or licorice compounds. Hobart mixes the aqueous solution of sodium silicate, a surface tension depressant and a filler and beats the mixture into a foam. He then causes a gelation of the mixture by adding a gelling agent which causes a precipitation of the silicon dioxide in the sodium silicate resulting in the foam gelling or setting up to give it a certain amount of rigidity. Hobart gives as examples of his gelling agent acid salts, acid gases, sulfuric acid, phenols, and specifically carbon dioxide gas, boric acid, bicarbonates, bisulfates, aluminum sulfate and calcium sulfate. The product made by the Hobart process is cast into various shapes and allowed to dry.

The Dess patent discloses the formation of a solidified mineral foam from the reaction mixture of finely divided silicon, pulverized silica, aqueous sodium silicate, sodium fluosilicate and a surface-active agent. The Sams patent discloses a mass of intumesced alkali silicate reinforced with organic fibers and expanded by reaction of finely divided silicon and its alloys and set by reaction with finely divded sodium fluosilicate.

The products made by the process of Hobart, Dess and Sams depend greatly upon some filler to give them strength, and to stabilize the foam while the solidification reaction is advancing. One form of applicants' product does not require filler and below a dry density of approximately 20 pounds per cubic foot it has greater compressive strength than solidified foams which do have fillers.

SUMMARY OF THE INVENTION

It is a general object of the present invention to provide a process for making a rigid foamed product from an aqueous solution of sodium silicate without the inclusion of any substantial amount of filler or of a separate gelling agent, although the gelling agent may be included.

A more particular object of the present invention is to provide such a process and product by mixing a surface tension depressant with an aqueous solution of sodium silicate (which may include some potassium silicate), frothing the mixture into a foam, and forming a silicon dioxide polymer by reacting the foamed silicate free of any substantial amount of filler with a silicon dioxide polymer forming agent.

Another general object of the present invention is to provide a process for making a foamed product, containing fibrous filler, from an aqueous solution of sodium silicate and applying it to surfaces, especially vertical and overhead surfaces, by spraying the product on such surfaces.

Other and further objects, features and advantages will be apparent from the following description of the presently preferred examples of the present invention, given for the purpose of disclosure.

This invention is based upon the discovery that there can be produced an excellent solidified foamed material free of any substantial amount of filler, by subjecting a mixture of surface tension depressant and an aqueous solution of sodium silicate to mixing at above atmospheric pressure with gas to form a foam and forming a polymer of silicon dioxide in the foam by blending and reacting with the foam a silicon dioxide polymer forming agent, all under such conditions that the final product has a density, when dry, of not greater than approximately 20 pounds per cubic foot, an average cell size no greater than about 300 microns in diameter, an average cell wall thickness no greater than about 16 microns, and at least 50 cells per cubic millimeter. Alkali metal silicate gelling agents may be included if desired.

In commercially available sodium silicate, the ratio of sodium oxide to silicon dioxide varies from about 1 to 1 to 1 to 5 both by weight and molecularly. Silicon dioxide is insoluble in water but the sodium oxide is soluble. Therefore, it is normally desirable to use sodium silicate that has as high a ratio of silicon dioxide to sodium oxide as practicable as this decreases the amount of soluble material in the final product. Since the sodium silicate used as a raw material is an aqueous solution of sodium silicate, the higher the ratio of silicon dioxide to sodium oxide the less soluble the sodium silicate is in water. A large amount of water is undesirable. The preferred sodium silicate has 42° Baumé with a ratio of silicon dioxide to sodium oxide about 3.22 to 1 at 39 to 42% solids.

The purpose of using surface tension depressants in this invention is the same as in the prior art. It is to reduce the surface tension of the aqueous solution of silicate to allow it to be foamed. Among the surface tension depressants which may be used are soaps, detergents, surface-active agents, and precursors thereof. Palmitic, oleic, stearic, linoleic, naphthenic and lauric soaps and mixtures thereof and various soaps sold under commercial names may be used. Precursors of soap include saponifiable materials such as organic acids and esters of organic acids including naphthenic acids, rosin acids, tall oil acid, corn oil, soybean oil, and tallow acid. Examples of detergents are the alkaline earth salts of alkyl sulfonate and of alkaryl sulfonate and various commercial detergents. Surface-acting agents include fatty acid esters of isethionate, substituted taurate salt, sodium salts of sulfated alkaryloxyethers of polyols, fatty acids, alcohol amine condensates, amides, polyoxyethylated fatty alcohols, and alkyl-aryl polyoxy ether-ols.

Since the surface tension depressants are normally organic materials, only as much surface tension depressant as is necessary to permit a foam to be formed should be added because organic materials are often undesirable in the finished product as many organic materials are combustible, are reactive with other organic materials and may mildew or attract vermin. Normally, between about 0.5 and 3 parts by weight of surface tension depressant to 100 parts by weight of the preferred aqueous sodium silicate solution are used. The preferred surface tension depressant is a mixture of tall oil acid and an oleic acid of low linoleic, linolenic or other polyunsaturated acid content.

If a gelling agent is used, it may be added at any time prior to the silicon dioxide polymer forming agent making the foam rigid. The purpose of using a gelling agent is to make the foam self-supporting until a silicon dioxide polymer is formed in the foam by the silicon dioxide polymer forming agent. Normally, the alkali metal silicate gelling agents are acids or precursors of acids or are materials which reduce the amount of water of solvation associated with the silicate such as alcohols, ketones, glycols, aldehydes and precursors of them. The various materials referred to in the Hobart Pat. No. 1,944,008 to effect gelation may be used as specific examples. Other specific examples are triacetin, vinyl acetate, methyl acrylate, triphenyl phosphite, metal soaps, aluminum alkoxides, and borax. Some gelling agents also serves as surface tension depressants such as fatty acids and hydrolyzable esters of fatty acids.

If a gelling agent is included, preferably only as small an amount as is necessary to give rigidity is used because most such gelling agents are organic materials themselves and precipitate silicon dioxide.

The silicon dioxide polymer forming agents are chemicals which cause a metathesis or acidification of the sodium silicate and a subsequent or simultaneous cross-linking or chain extension or both of silicon dioxide groups.

The silicon dioxide polymer forming agents are sodium fluorosilicate; potassium fluorosilicate; potassium fluoroborate; polyvalent metal salts of weak acids including calcium fluorosilicate, calcium fluoroborate and calcium fluorotitanate; binary inorganic salts; and mixtures thereof.

The term "weak acids" as used herein mean those acids which have a $pk_{A'}$ (logarithm of the disassociation constant) equal to or greater than 1.3. Examples of such acids are phosphoric acid, iodic acid, hydrofluoric acid, hydrogen tellurite, aluminic acid, boric acid, acetic acid, fumaric acid, maleic acid, malonic acid and succinic acid. Examples of the polyvalent metal salts of such weak acids include magnesium phosphate (tribasic); calcium fluorosilicate; calcium aluminate; calcium tellurite; barium hypophosphate; aluminum acetate (basic); calcium fluoride; calcium orthophosphate, calcium pyrophosphate pentahydrate; copper acetate monohydrate; calcium tungstate (scheelite); cadmium tungstate; borate salts of polyvalent metals such as zinc borate, aluminum borate, calcium borate, cobalt borate and iron borate; calcium fumarate, calcium maleate, calcium malonate and calcium succinate.

The preferred polymer forming agents are sodium fluorosilicate, potassium fluorosilicate, the calcium and zinc borates, the lithium calcium borates, and the sodium calcium borates with sodium fluorosilicate being the most preferred.

All these silicon dioxide polymer forming agents react at room temperature, but increasing the temperature will increase the rate of reaction.

When sodium fluorosilicate is the polymer forming agent, it is to be incorporated into the process as a powder or as a slurry of a powder with the particles in the powder being less than approximately 50 microns in diameter and with the preferred powder having 80% smaller than 50 micron diameter. If the particle size of this powder is larger, the reaction that takes place will be too slow, cells will coalesce, mechanical properties of the foam will degenerate, and the thermal conductivity will increase. For practical purposes, the particle size should be as uniform as possible.

These silicon dioxide polymer forming agents may be mixed with the aqueous solution of sodium silicate as powders or in slurries. The amount of polymer forming agent to be added depends upon the degree of polymerization of the final foam and the rate of stiffening desired. Preferably, sodium fluorosilicate is used and in an amount of about 10 to 15 parts by weight of sodium fluorosilicate to 100 parts by weight of the aqueous sodium silicate solution.

As stated previously, the dry solidified foamed material is to have a density of not greater than approximately 20 pounds per cubic foot, and an average cell size no greater than about 300 microns in diameter, an average wall thickness no greater than about 16 microns, and at least 50 cells per cubic millimeter. Preferably, this dry product will have a density of no greater than approximately 11 pounds per cubic foot, an average cell size no greater than about 300 microns in diameter, an average cell wall thickness no greater than about 6 microns, and at least 100 cells per cubic millimeter.

There may be more than one way to mix the reactants to form such a product, but the only way presently known to applicants is to subject the mixture of a surface tension depressant and the aqueous solution of sodium silicate to a high speed mixing at above atmospheric pressure until there is formed a wet foam having a wet density of not greater than approximately 43 pounds per cubic foot, an average cell size no greater than about 240 microns in diameter, an average cell wall thickness of no greater than 24 microns, at least 50 cells per cubic millimeter. Preferably this wet foam is then blended with the silicon dioxide polymer forming agent. However, the silicon dioxide polymer forming agent may be blended with the other ingredients either prior to or during the mixing at above atmospheric pressure, depending upon the speed at which the particular silicon dioxide polymer forming agent reacts.

To obtain the preferred condition in the dried product of a density of not greater than 11 pounds per cubic foot, applicants, during mixing, subject the mixture of surface tension depressant and sodium silicate to a pressure of between 20 and 80 p.s.i. to form a foam having a wet density of approximately 24 pounds per cubic foot, an average cell size no greater than about 240 microns in diameter, an average cell wall thickness no greater than about 12 microns, and at least 100 cells per cubic millimeter. These requirements for the wet foam can be determined by microscopic examination of it.

Applicants do not know of any foam made by chemically induced gas evolution which will have the microcellular size in either the wet or dry foam described above.

After the foam has been formed, it is allowed to solidify or cure. To prohibit the damaging of the foam during the solidification, it should harden at a temperature not less than about 10° F. cooler than the temperature at which the foam is formed. At cooler temperatures, the foam will be damaged by contraction. If the foam hardens in a mold which is not completely filled or which is not sufficiently pressurized, then the temperature of the foam during hardening should be maintained no more than about 5° F. above the temperature at which it was formed, otherwise structural damage to the foam will be caused as a result of expansion. If the mold is completely filled with the foam before it hardens or if the mold has sufficient pressure to prevent expansion, then this upper temperature limit need not be observed.

As stated previously herein, this solidified foam product is formed free of any substantial amount of filler. By "substantial amount" of filler is meant an amount of filler in excess of about 2.5% by weight of the alkali metal silicate raw material on a dry basis. The term "filler," as used herein, means and includes a material which does not lose its chemical identity and is inert to the chemical reaction between the sodium silicate and the silicon dioxide polymer forming agent. Examples of fillers are silica, asbestos fibers and glass fibers. The fillers apparently destroy the continuous nature of the microcellular silicon dioxide polymer that is formed.

It has been found that quite surprisingly a dry solidified foam having a density of no greater than about 20 pounds per cubic foot on a dry basis, an average cell size no greater than about 300 microns in diameter, an average wall thickness of no greater than 16 microns and at least 50 cells per cubic millimeter has greater compressive strength than a product of the same density with filler.

In another form of the present development, fibrous filler, preferably approximately ¼-inch glass or asbestos fiber, is required. This is the type of product that is used in the continuous process of the present invention for spraying on vertical and overhead surfaces to adhere to and coat those surfaces.

If the wet foam contains no more than approximately 4% by weight fibrous filler, has an average cell size of no greater than about 300 microns, and at least 50 cells per cubic millimeter, it can be forced by pressure and before drying through a conduit onto surfaces to form a coating. The preferred density of foam sprayed on surfaces that will be exposed to some wear is in excess of approximately 25 pounds per cubic foot wet. The fibrous filler is necessary because the product contracts during drying and the filler prevents undue fracturing and separation of the product from the coated surface.

In either form of the invention, that is with or without the filler, the requirements of wet foam density, cell size, cell wall thickness and number of cells per unit of volume may be determined either immediately downstream of the mixer or of the blender as these characteristics do not change appreciably within the period of time necessary for the material to go through the blender.

BRIEF DESCRIPTION OF THE DRAWINGS

The drawings are illustrations of presently preferred apparatus which can be used with a continuous process for making a foamed product with or without the inclusion of fibrous fillers.

DESCRIPTION OF THE PREFERRED EMBODIMENTS

Figure 3:
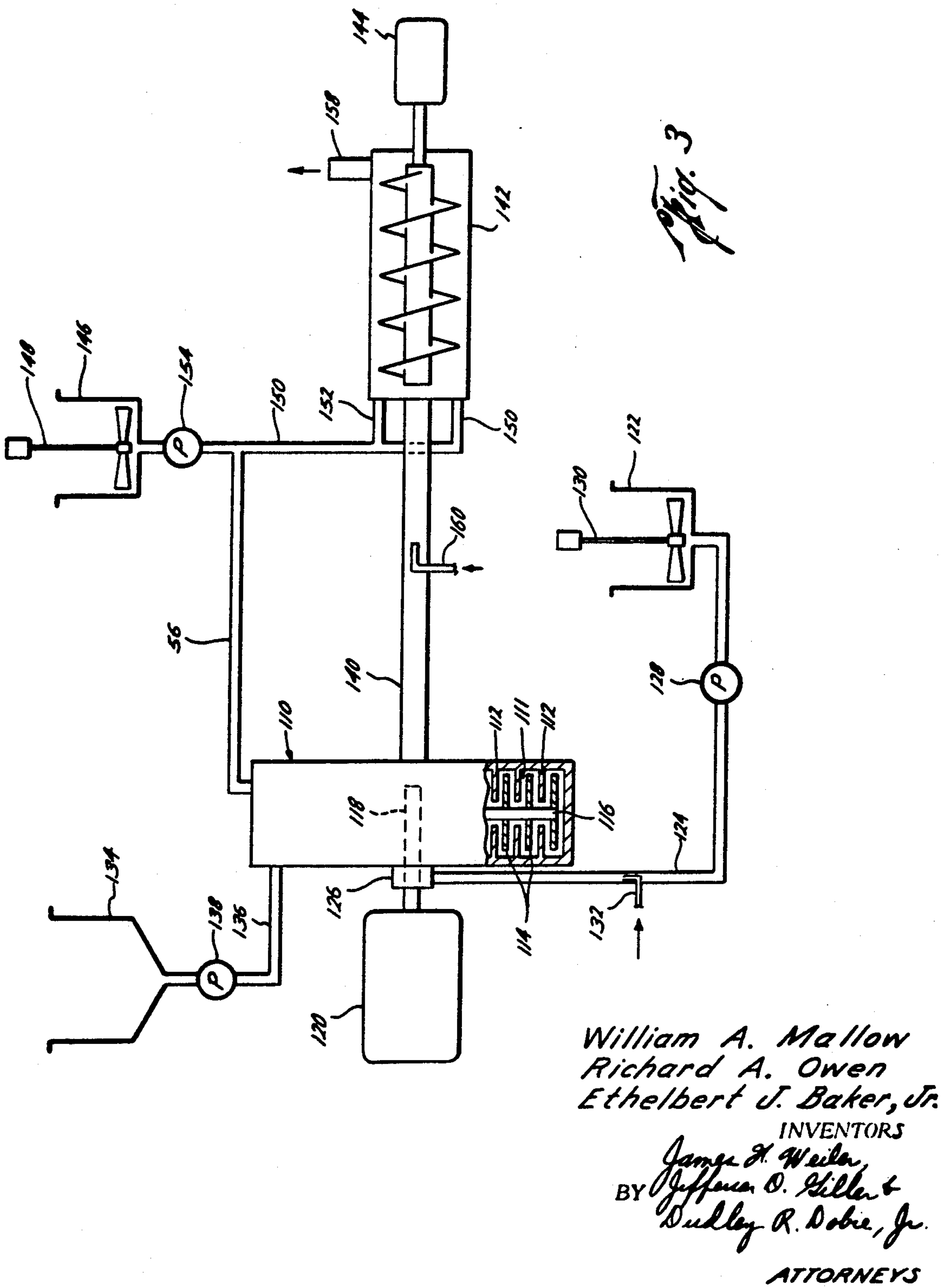
FIG. 3 is a schematic illustration of another form of apparatus.

Referring to FIG. 3, there is provided a high sheer continuous mixer 110 having an annular cavity 111 and being provided internally with a set of fixed or stator blades 112 between which move the rotor blades 114 mounted on a rotor 116 secured to a shaft 118 driven by a motor 120. A Model 8 M–1 high speed mixer manufactured by The E. T. Oakes Corporation, 26 Commack Road, Islip, Long Island, N. Y. 11751 is quite satisfactory.

A first container 122 with an agitator 130 serves as an aqueous silicate reservoir and is connected by a tubular conduit 124 to the interior of the mixer 110 by a connection at a housing 126 on the shaft 118. A positive displacement proportioning pump 128 forces material from the first container 122 through the conduit 124 into the interior of the mixer 110. Air under pressure is injected into the interior of the mixer 110 through an air inlet line 132 communicating with the conduit 124.

A second container 134 serves as a reservoir for the surface tension depressant and, if desired, a gelling agent. This second container 134 is connected to the interior of the mixer 110 through another tubular conduit 136. Material in the second container 134 is moved through the tubular conduit 136 by means of a positive displacement proportioning pump 138.

The wet foam formed in the mixer 110 flows out of the mixer 110 through a tubular conduit 140 into a ribbon blender 142 driven by a motor 144. Since ribbon blenders are well known, no further description of this blender 142 is necessary.

A third container 146 equipped with a mechanical agitator 148 serves as a reservoir for the silicon dioxide polymer forming agent. It is connected through a tubular conduit 150 and branch line 152 to the interior of the ribbon blender 142 to blend with the wet foam entering the blender through the conduit 140. Material in the third container 146 is moved through the conduit 150 by means of a positive displacement proportioning pump 154. Alternatively, the silicon dioxide polymer forming agent may be supplied to the mixer 110 rather than to the ribbon blender 142 and this can be done by a branch line 156 having one end in communication with the interior of the mixer 110 and the other in communication with the conduit 150 downstream of the proportioning pump 154.

All the material entering the ribbon blender 142 is discharged through a discharge conduit 158 which may flow to a mold or may be connected to a flexible conduit and nozzle for forcing material under pressure onto various surfaces.

If fibrous filler is to be used, this fiber may be introduced into the system at a fiber injection line 160 or may be mixed with the sodium silicate in the first container 122.

Figures 1, 2:
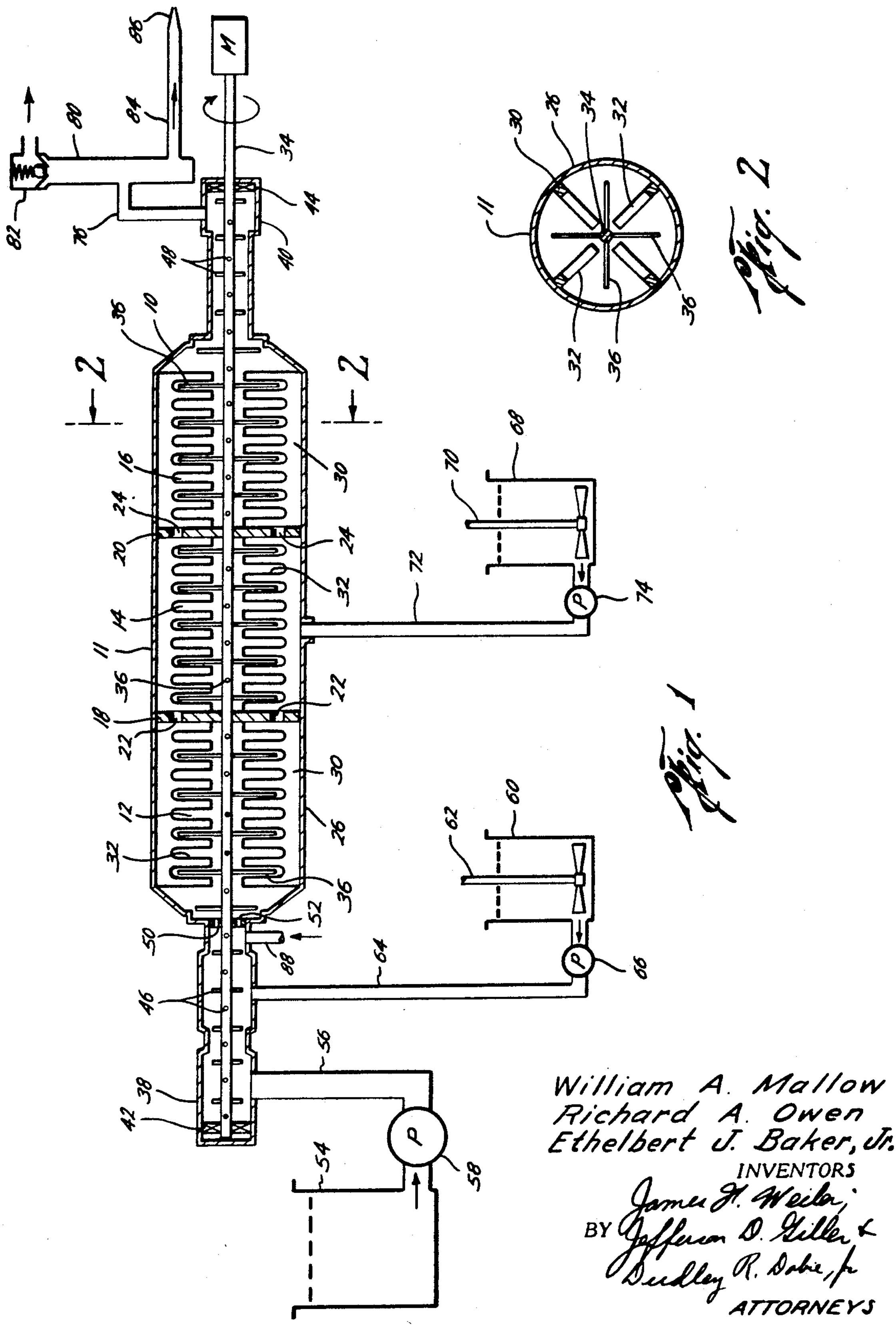
FIG. 1 is a sectional view of one form of apparatus.
FIG. 2 is a view along the line 2—2 of FIG. 1.

Referring to the embodiment of FIGS. 1 and 2, there is provided a pressure reaction vessel 10 having a generally cylindrical main body 11, a generally tubular housing 38 connected to the left end and along the axis of the main body 11 and another generally tubular housing 40 connected to the right end and along the axis of the main body 11 as viewed in FIG. 1. Within the main body 11 are a first chamber 12, a second chamber 14 and a third chamber 16 with the first and second chambers being separated from each other by a dividing plate 18 and the second and third chambers being separated by another dividing plate 20. A plurality of passageways 22 through the dividing plate 18 interconnect the first chamber 12 and the second chamber 14. A plurality of passageways 24 through the dividing plate 20 interconnect the second chamber 14 and the third chamber 16.

Attached to the inside of the cylindrical wall 26 of the main body 11 and extending along its length is a cylindrical stator base 30 from which protrudes toward the axis of the main body 11 a series of four stators 32, such series extending axially along the main body 11 and existing in all three chambers 12, 14 and 16.

A rotatable shaft 34 extends through and is located on the axis of the main body 11. Secured along the shaft 34 within the main body 11 are a series of rotor rods 36 which extend radially from the shaft 34 into the spaces between the stators 32.

The left-hand portion of the shaft 34 as viewed in FIG. 1 extends beyond the main body 11 and is enclosed in the housing 38. The right end of that shaft 34 extends beyond the main body 11 and is enclosed in the tubular housing 40. The shaft 34 is rotatably supported by a bearing and seal arrangement 42 near its left end and by another bearing and seal arrangement 44 in the housing 40. The shaft 34 extends to the right beyond the housing 40 as viewed in FIG. 1 and is rotated by a motor M.

Rigidly secured to the shaft 34 within the housing 38 is a second group of rotor rods 46 and rigidly secured to the shaft 34 within the housing 40 is a third group of rotor rods 48. A divider plate 50 separates the interior of the housing 38 from the first chamber 12 but passageways 52 through that divider plate 50 interconnect between the interior of the housing 38 and the first chamber 12.

A first container 54 serves as an aqueous silicate reservoir and is connected by a tubular conduit 56 to the interior of the housing 38. A positive displacement proportioning pump 58 forces material from the first container 54 through the conduit 56 into the interior of the housing 38. A second container 60 equipped with a mechanical agiator 62 serves as a reservoir for the surface tension depressant and, if desired, a gelling agent. This second container 60 is connected to the interior of the housing 38 through another tubular conduit 64. Material in the second container 60 is moved through the tubular conduit 64 into the interior of the housing 38 by means of a positive displacement proportioning pump 66.

A third container 68 equipped with a mechanical agitator 70 serves as a reservoir for silicon dioxide polymer forming agent. It is connected through a tubular conduit 72 to the interior of the second chamber 14. Material in the third container 68 is moved through the conduit 72 into the second chamber 14 by means of a positive displacement proportioning pump 74.

Air under pressure is supplied from a source, not shown, to the interior of the housing 38 through a conduit 88.

Extending radially from the housing 40 is a conduit 76 interconnecting the interior of the housing 40 with a header 80 having at its upper end an air-pressure relief valve 82 and near its lower end a hose 84 forming a tubular conduit having a nozzle 86 at its free end.

In operation of the device of the drawing, an aqueous solution of sodium silicate is placed in the first container 54, a surface tension depressant and, if desired, a gelling agent is placed in the second container 60 and agitated by the agitator 62. A slurry of silicon dioxide polymer forming agent is placed in the third container 68 and agitated by the agitator 70. Air under pressure is supplied through line 88 and the shaft 34 is rotated by the motor M. The proportioning pump 58 is started pumping aqueous solution of silicate into and through the housing 38 and immediately thereafter the proportioning pump 66 is started pumping the surface tension depressant and the gelling agent, if any is present, into the interior of the housing 38 also. Initial mixing of the material from the first container 54 and the second container 60 takes place within the housing 38 as a result of a rotation of the rotor rods 46.

The material within the housing 38 is moved into the first chamber 12 through the passageways 52 by force from the pumps 58 and 66. Air under pressure from the conduit 88 is mixed with the material in the housing 38 before it enters the first chamber 12.

The material within the first chamber 12 is beaten into a froth or foam by the rotation of the rotor rods 36 and is moved from the first chamber 12 through the passageways 22 in the divider plate 18 and into the second chamber 14 by pressure from the pumps 58 and 66 and the air entering from the conduit 88. Within the second chamber 14, the frothing continues. The silicon dioxide polymer forming agent is fed to that chamber by operation of the pump 74 and mixed into the foam to initiate formation of the silicon dioxide polymer.

The material within the second chamber 14 is forced through the passageways 24 in the divided plate 20 into the third chamber 16 by means of the three pumps 58, 66 and 74 and the air entering the conduit 88. Within the third chamber 16, the frothing continues. The material is forced from the third chamber 16 by the same pumps and air pressure through the housing 40 during which mixing continues because of the rotation of the rotor rods 48. Pressure forces the foam from the housing 40, through the conduit 76, and into the header 80 where any excessive air is vented through the pressure relief valve 82. The foam leaves the header 80, passes through the hose 84 to a mold or onto a surface to harden.

Various gauges, controls and other accessories are not illustrated or described in the various figures as they are not necessary to an understanding of the invention.

Set forth hereafter are various examples illustrating the present invention.

EXAMPLE 1

Using the apparatus of FIG. 3, an aqueous sodium silicate solution of 39.3% solids and having a ratio of silicon dioxide to sodium oxide of 3.22 parts by weight was placed in container 122. Distilled tall oil acid was placed in container 134 and sodium fluorosilicate in a 75% solids slurry in water was placed in container 146. Air was fed at a pressure slightly in excess of 20 p.s.i.g through the conduit 132. The shaft 118 of the mixer 110 was rotated at 700 r.p.m. The pump 128 was operated at the rate of ½ gallon (5.89 pounds) per minute, and pump 138 at 25 to 50 grams per minute. The container 146 was connected to the blender 142 and pump 154 was operated at 497 grams per minute. The wet foam leaving the mixer 110 and also leaving the blender 142 had a wet density of about 22 to 24 pounds per cubic foot, an average cell size between 40 and 240 microns in diameter, an average cell wall thickness of 8 to 12 microns and at least 100 cells per cubic millimeter. This material passed through the ribbon blender 142 which thoroughly blended the foam with the sodium fluorosilicate. The material leaving the blender 142 was placed in molds and hardened in about one hour. When it was dry, it had a density of 10 to 11 pounds per cubic foot, an average cell diameter of between 50 and 300 microns, an average cell wall thickness of between 4 and 6 microns, and an average of approximately 100 cells per cubic millimeter. This product had a compressive strength of over 75 p.s.i.

EXAMPLE 2

This example is the same as Example 1 except there was added to the sodium silicate in the sodium silicate container a fibrous filler which was ¼-inch chopped glass fiber in an amount equal to approximately 1% of the aqueous sodium silicate solution. The foam leaving the blender was sprayed onto various vertical and overhead walls of rock, earth, cement, wood and steel and adhered thereto as a coating.

EXAMPLE 3

This is hte same as Example 1 except there was added to the aqueous sodium silicate solution a fibrous filler consisting of approximately 0.01-inch long synthetic magnesium silicate fiber in an amount equal to approximately 4% by weight of the aqueous sodium silicate solution. The foam leaving the blender was sprayed on various overhead and vertical walls and adhered thereto as a coating.

EXAMPLE 4

This example is similar to Example 1 but a gelling agent was included. The same aqueous sodium silicate solution as used in Example 1 was placed in the container 122. A mixture of 25 to 50 parts by weight tall oil acid (surface tension depressant) to 54 parts by weight triacetin (gelling agent) was placed in container 134. In container 146 was placed the silicon dioxide polymer forming agent which was a mixture of a 75% solids slurry of sodium fluorosilicate in water and 50% solids slurry of zinc borate in water in a ratio of 248 parts of sodium fluorosilicate slurry to 150 parts zinc borate slurry. The shaft 118 was rotated at 700 r.p.m. and air was introduced through the line 132 slightly in excess of 20 p.s.i.g. The sodium silicate solution was pumped at a rate of ½-gallon (5.89 pounds) per minute. The material in container 134 was pumped at the rate of 79 grams per minute. The mixture in container 146 was pumped at a rate of 409 grams per minute. The foam had a density of 10 pounds per cubic foot when dry and about 20 pounds per cubic foot when wet. The cell size, cell wall thickness and number of cells per cubic millimeter were approximately the same as for the product on a wet and dry basis in Example 1.

EXAMPLE 5

This example is illustrative of a process carried out at atmospheric pressure. As a result, the cell size of the foam was too large and the compressive strength of the dried product was reduced below what it would have been had the cell size been in the range of 50 to 300 microns in diameter. In this example, a batch process was used. Into a 3-liter vessel equipped with a mechanical stirrer was placed 500 grams of aqueous sodium silicate solution containing 39 to 40% solids of the sodium silicate with the ratio of silicon dioxide to sodium oxide being between 3.22 to 1 by weight. To this mixture was added 15 grams of tall oil acid and the mixture was thoroughly blended at atmospheric pressure. 70 grams of powdered sodium fluorosilicate (less than 50 microns in size) was added and blended. The mechanical mixing continued and within about 2 or 3 minutes after the addition of the sodium fluorosilicate, a foam of at least 4-fold expansion was developed. The resultant foam was immediately removed from the vessel and placed in a mold where it was allowed to stand for in excess of one hour to permit the silicon dioxide polymer to form. There resulted a structure which was self-supporting and rigid. This product was allowed to dry by evaporation and then heated by oven drying. The dried foam had a density of 8 pounds per cubic foot, but the cell size of the foam ranged between 50 and 1000 microns in diameter. This foamed product did not have the compressive strength that it would have had if the cell sizes had been between 50 and 300 microns in diameter.

EXAMPLE 6

Example 6 is the same as Example 1 except instead of using sodium fluorosilicate as the silicon dioxide polymer forming agent, there was used a 9 to 1 mixture of sodium fluorosilicate to potassium fluorosilicate in a 75% solids slurry. The foamed product had approximately the same characteristics of density, cell diameter, cell wall thickness, and number of cells per unit of volume that the product in Example 1 had. However, the mixture of sodium fluorosilicate and potassium fluorosilicate resulted in a faster rate of polymerization than did the use of sodium fluorosilicate alone.

EXAMPLE 7

Example 7 is the same as Example 1 except that the silicon dioxide polymer forming agent in this example was magnesium tribasic phosphate in a 20% by solid slurry rather than sodium fluorosilicate in a 75% solids slurry. In this example, the magnesium tribasic phosphate slurry was fed at the rate of 2665 grams per minute. When using magnesium tribasic phosphate as the silicon dioxide polymer forming agent, the rate of polymerization is decreased from that when using sodium fluorosilicate. The foamed product in this Example 7 had approximately the same density, cell size, cell wall thickness, and number of cells per unit of volume as the product of Example 1, but the product had less compressive strength than the product of Example 1.

EXAMPLE 8

This is a comparison to show the effect of the presence of filler in applicants' solidified foam product. In each of the tests set forth in Table A below, the fluid foam was made in accordance with Example 1 and included a mixture of 1 to 2 parts fatty acid, 15 parts sodium fluorosilicate at room temperature with or without the addition of glass fibers in the form of ½-inch chopped glass fibers. The various densities of the final foam product were controlled by the conditions of frothing, that is, the greater the air pressure and the greater the time involved in frothing, the smaller the density of the final product. The fluid foamed mixture was in a mold and allowed to cure.

In Table A, the listed percentage of glass fiber is percentage of the weight of the dry solidified foam. The densities of 8, 10 and 15 pounds per cubic foot are on a dry basis and the comparative strength listed for those densities are in the pounds per square inch which cause 10% deformation under compression.

TABLE A

| | Compressive strength of— | | |
|---|---|---|---|
| Percent glass fibers, dry basis | 8 lb./cu. ft. density | 10 lb./cu. ft. density | 15 lb./cu. ft. density |
| 0 | 30 | 70 | 100 |
| 2.5 | 12 | 20 | 30 |
| 4.0 | 5 | 10 | 15 |

EXAMPLE 9

Using the apparatus of FIG. 1, an aqueous sodium silicate solution of 39.3% solids and having a ratio of silicon dioxide to sodium oxide of 3.22 parts by weight was placed in container 54. Distilled tall oil acid was placed in container 60 and sodium fluorosilicate in a 75% solids slurry in water was placed in container 68. Air was fed at a pressure slightly in excess of 80 p.s.i.g. through conduit 88 and the pressure relief valve 82 was set at 80 p.s.i.g. The shaft 34 was rotated at 1750 r.p.m. The pump 58 was operated at the rate of ½ gallon (5.89 pounds) per minute, pump 66 at 75 cc. (80 grams) per minute, and pump 74 at 497 grams per minute. The resultant foam had a density of 15 to 17 pounds per cubic foot when wet and 8 pounds per cubic foot when dry. It hardened in one hour. The foam skin was rigid as contrasted to semiplastic and the dried foam was completely insoluble upon exposure to 100% humidity at 160° F. for 24 hours. The dry foam had an average cell size of between about 50 and 300 microns in diameter, an average cell wall thickness of between about 4 and 6 microns, and at least 100 cells per cubic millimeter.

EXAMPLE 10

This example uses the apparatus of FIG. 1 and is similar to Example 9 but a gelling agent was included. The same aqueous sodium silicate solution as used in Example 9 was placed in container 54. A mixture of 80 parts by weight naphthenic acid (surface tension depressant) to 54 parts by weight triacetin (gelling agent) was placed in container 60. In container 68 was placed the silicon dioxide polymer forming agent which was a mixture of a 75% solids slurry of sodium fluorosilicate in water and 50% solids slurry of zinc borate in water in a ratio of 248 parts of sodium fluorosilicate slurry to 160 parts zinc borate slurry. The shaft 34 was rotated at 1750 r.p.m. and air was introduced through the line 88 slightly in excess of 80 pounds per square inch. The relief valve 82 was set for 80 pounds per square inch. The sodium silicate solution was pumped at a rate of ½ gallon (5.89 pounds) per minute. The material in container 60 was pumped at the rate of 134 grams per minute. The mixture in container 68 was pumped at a rate of 409 grams per minute. The foam had a density of 10 pounds per cubic foot when dry and about 20 pounds per cubic foot when wet. The dry foam had an average cell size of between about 50 and 300 microns in diameter, an average cell wall thickness of between about 4 and 6 microns, and at least 100 cells per cubic millimeter.

From the foregoing discussions, examples and description of the invention, it is apparent that the objects set forth herein as well as others have been achieved. Those skilled in the art will recognize that the principles of this invention may be applied in several ways, only a few of which have been exemplified herein specifically. Accordingly, the invention is to be limited only by the spirit thereof and the scope of the appended claims.

What is claimed is:

1. In a process for making a foamed product from an alkali metal silicate including forming a mixture of surface tension depressant and an aqueous solution of sodium silicate, the improvement comprising:

(a) subjecting the mixture to mixing with gas at above atmospheric pressure until there is formed a wet foam having a wet density of no greater than approximately 43 pounds per cubic foot, an average cell size no greater than about 240 microns in diameter, an average cell wall thickness no greater than about 24 microns, and at least 50 cells per cubic millimeter, and (b) forming a polymer of silicon dioxide free of any substantial amount of filler by blending and reacting with the wet foam a silicon dioxide polymer forming agent selected from the group consisting of sodium fluorosilicate, potassium fluourosilicate, potassium fluoroborate, calcium fluorosilicate, calcium fluoroborate, calcium fluorotitanate, magnesium phosphate, calcium fluorosilicate, calcium aluminate, calcium orthophosphate, calcium pyrophosphate, zinc borate, aluminum borate, calcium borates, iron borate, lithium calcium borates, sodium calcium borates, and mixtures thereof in an amount sufficient to make a foamed product rigid and resistant to being solubilized by water.

2. The process of claim 1 in which the silicon dioxide polymer forming agent includes sodium fluorosilicate.

3. The process of claim 1 in which the wet foam of step (a) has a density of no greater than approximately 24 pounds per cubic foot, an average cell size no greater than about 240 microns in diameter, an average cell wall thickness of no greater than about 12 microns, and at least 100 cells per cubic millimeter.

4. The process of claim 3 in which the silicon dioxide polymer forming agent includes sodium fluorosilicate.

5. The process of claim 1 in which the silicon dioxide polymer forming agent is selected from the group consisting of sodium fluorosilicate, potassium fluorosilicate, calcium borate, zinc borate, lithium calcium borates, sodium calcium borates and mixtures thereof.

6. The process of claim 3 in which the silicon dioxide polymer forming agent is selected from the group consisting of sodium fluorosilicate, potassium fluorosilicate, calcium borate, zinc borate, lithium calcium borates, sodium calcium borates and mixtures thereof.

7. The process of claim 2 in which the sodium fluorosilicate is a powder with the particles in the powder being less than approximately 50 microns in diameter.

8. A solidified foamed material free of any substantial amount of filler comprising the foamed product of a mixture of aqueous sodium silicate, a surface tension depressant and a silicon dioxide polymer forming agent selected from the group consisting of sodium fluorosilicate, potassium fluorosilicate, potassium fluoroborate, calcium fluorosilicate, calcium fluoroborate, calcium fluorotitanate, magnesium phosphate, calcium fluorosilicate, calcium aluminate, calcium orthophosphate, calcium pyrophosphate, zinc borate, aluminum borate, calcium borates, iron borate, lithium calcium borates, sodium calcium borates, and mixtures thereof, the foamed material having a density when dry of no greater than approximately 20 pounds per cubic foot, an average cell size no greater than about 300 microns, an average wall thickness of no greater than about 16 microns, and at least 50 cells per cubic millimeter.

9. The material of claim 8 in which the silicon dioxide polymer forming agent includes sodium fluorosilicate.

10. The material of claim 8 in which the foamed material when dry has a density of no greater than approximately 11 pounds per cubic foot, an average cell size no greater than about 300 microns in diameter, an average cell wall thickness no greater than about 6 microns, and at least 100 cells per cubic millimeter.

11. The material of claim 10 in which the silicon dioxide polymer forming agent includes sodium fluorosilicate.

12. The material of claim 8 in which the silicon dioxide polymer forming agent is selected from the group consisting of sodium fluorosilicate, potassium fluorosilicate, calcium borate, zinc borate, lithium calcium borates, sodium calcium borates, and mixtures thereof.

13. The material of claim 10 in which the silicon dioxide polymer forming agent is selected from the group consisting of sodium fluorosilicate, potassium fluorosilicate, calcium borate, zinc borate, lithium calcium borates, sodium calcium borates, and mixtures thereof.

14. A continuous process for making a foamed product from a sodium silicate and applying it to surfaces comprising:

(a) subjecting a mixture of (i) not more than about 4% by weight fibrous filler, (ii) a surface tension depressant and (iii) an aqueous solution of sodium silicate to mixing with gas at above atmospheric pressure until there is formed a wet foam having an average cell size no greater than about 300 microns in diameter and at least 50 cells per cubic millimeter, (b) blending and reacting with the wet foam a silicon dioxide polymer forming agent selected from the group consisting of sodium fluorosilicate, potassium fluorosilicate, potassium fluoroborate, calcium fluoroborate, calcium fluorotitanate, magnesium phosphate, calcium fluorosilicate, calcium aluminate, calcium orthophosphate, calcium pyrophosphate, zinc borate, aluminum borate, calcium borates, iron borate, lithium calcium borates, sodium calcium borates, and mixtures thereof in an amount sufficient to make a foamed product rigid and resistant to being solubilized by water upon hardening, and (c) forcing the foam of step (b) by pressure and before it becomes rigid through a conduit onto a surface.

15. The process of claim 14 in which the silicon dioxide polymer forming agent includes sodium fluorosilicate.

16. The process of claim 14 in which the wet foam has a density in excess of approximately 25 pounds per cubic foot.

17. The process of claim 15 in which the wet foam has a density in excess of approximately 25 pounds per cubic foot.

18. The process of claim 14 in which the silicon dioxide polymer forming agent is selected from the group consisting of sodium fluorosilicate, potassium fluorosilicate, calcium borate, zinc borate, lithium calcium borates, sodium calcium borates and mixtures thereof.

19. The process of claim 16 in which the silicon dioxide polymer forming agent is selected from the group consisting of sodium fluorosilicate, potassium fluorosilicate, calcium borate, zinc borate, lithium calcium borates, sodium calcium borates and mixtures thereof.

References Cited

UNITED STATES PATENTS

| | | | |
|---|---|---|---|
| 1,944,008 | 1/1934 | Hobart | 106—75 |
| 3,136,645 | 6/1964 | Dess | 106—75 |
| 3,466,221 | 9/1969 | Sams et al. | 106—75 X |
| 3,150,989 | 9/1964 | Parsons | 252—3 X |
| 3,144,346 | 8/1964 | Dilnot | 106—75 |
| 3,661,602 | 5/1972 | Gerow | 106—75 |

ROLAND E. MARTIN, Jr., Primary Examiner

U.S. Cl. X.R.

106—75

UNITED STATES PATENT OFFICE
CERTIFICATE OF CORRECTION

Patent No. 3,741,898 Dated June 26, 1973

Inventor(s) William A. Mallow, Richard A. Owen, Ethelbert J. Baker, Jr.

It is certified that error appears in the above-identified patent and that said Letters Patent are hereby corrected as shown below:

Column 9, line 12, cancel "150" and insert -- 160 --.

Signed and sealed this 18th day of December 1973.

(SEAL)
Attest:

EDWARD M. FLETCHER, JR.
Attesting Officer

RENE D. TEGTMEYER
Acting Commissioner of Patents